(12) United States Patent
Gilman

(10) Patent No.: US 7,941,384 B2
(45) Date of Patent: *May 10, 2011

(54) CANONICAL MODEL TO NORMALIZE DISPARATE PERSISTENT DATA SOURCES

(75) Inventor: John Gilman, Tiburon, CA (US)

(73) Assignee: International Business Machines Corporation, Armonk, NY (US)

( * ) Notice: Subject to any disclaimer, the term of this patent is extended or adjusted under 35 U.S.C. 154(b) by 441 days.

This patent is subject to a terminal disclaimer.

(21) Appl. No.: 12/195,532

(22) Filed: Aug. 21, 2008

(65) Prior Publication Data

US 2008/0306970 A1    Dec. 11, 2008

Related U.S. Application Data

(63) Continuation of application No. 11/384,874, filed on Mar. 20, 2006, now Pat. No. 7,461,039.

(60) Provisional application No. 60/715,108, filed on Sep. 8, 2005.

(51) Int. Cl.
*G06F 15/18* (2006.01)
*G06N 3/08* (2006.01)

(52) U.S. Cl. .......................................................... 706/25

(58) Field of Classification Search ...................... 706/25
See application file for complete search history.

(56) References Cited

U.S. PATENT DOCUMENTS

| | | | |
|---|---|---|---|
| 6,094,652 A | 7/2000 | Faisal | |
| 6,888,543 B2 | 5/2005 | Ingber et al. | |
| 6,980,993 B2 | 12/2005 | Horvitz et al. | |
| 6,986,104 B2 | 1/2006 | Green et al. | |
| 6,990,238 B1 | 1/2006 | Saffer et al. | |
| 7,225,199 B1 | 5/2007 | Green et al. | |
| 7,249,117 B2 | 7/2007 | Estes | |
| 7,284,008 B2 | 10/2007 | Henkin et al. | |
| 2004/0083199 A1 | 4/2004 | Govindugari et al. | |

OTHER PUBLICATIONS

Banerjee, A; Ghosh, J.;Competitive Learning Mechanisms for Scalable, Incremental and Balanced Clustering of Streaming Texts; Proceedings of the International Joint Conference on Neural Networks (IJCNN); Jul. 20-24, 2003; pp. 2697-2702; vol. 4; Digital Object Identifier 10; 1109/IJCNN 2003 1223993.

Fonseca, I.L.; The Impact of Data Normalisation on Unsupervised Continuous Classification of Landforms; Geoscience and Remote Sensing Symposium, 2003; IGARSS '03; Proceedings. 2003 IEEE International; Jul. 21-25, 2003; pp. 3426-3428; vol. 6; Digital Object Identifier 10; 1109/IGARSS 2003; 1294810.

(Continued)

*Primary Examiner* — Michael Holmes
(74) *Attorney, Agent, or Firm* — Stevens & Showalter LLP

(57) ABSTRACT

A semantic database transaction monitor is provided that monitors database transactions by taking advantage of database replication technology. The invention receives one or more event streams of transaction data from one or more database replication software agents, originally from transaction logs, and then classifies each transaction, utilizing an inference engine populated with one or more source ontologies and a canonical ontology so that transaction metadata are normalized. The invention then can be utilized to create a data store across multiple databases for reporting and analysis. The invention can also be used to feed normalized database transactions to real-time graphics software for real-time reporting or alerting. Because the process obtains data from event streams, it does not significantly drain the resources of the databases and can provide virtually real-time monitoring. Moreover, it does not require recoding for updates to the databases, but only changes to the ontologies read at runtime.

10 Claims, 7 Drawing Sheets

OTHER PUBLICATIONS

Ni, D.C.; Martinez, J.; Eccles, J.; Thomas, D.; Lai, P.K.M.; Process Automation with Enumeration and Traceability Tools; Industrial Technology, 1994; Proceedings of the IEEE International Conference on Dec. 5-9, 1994; pp. 361-365; Digital Object Identifier 10; 1109/ICIT 1994; 467095.

Soni, R.A.; Gallivan, K.A.; Jenkins, W.K.; Convergence Properties of Affine Projection and Normalized Data Reusing Methods; Signals, Systems & Computers, 1998; Conference Record of the Thirty-Second Asilomar Conference on vol. 2; Nov. 1-4, 1998; pp. 1166-1170 vol. 2; Digital Object Identifier 10; 1109/ACSSC 1998; 751444.

Transforming transactions to destination canonical instances.
3100

Storing the normalized data.
3200

CANONICAL MODEL TO NORMALIZE DISPARATE PERSISTENT DATA SOURCES

CROSS-REFERENCE TO RELATED APPLICATIONS

This application claims the benefit of PPA Ser. No. 60/715,108, filed Sep. 8, 2005 by the present inventor.

FIELD OF THE INVENTION

This innovation relates to a method to normalize and monitor disparate persistent data sources.

BACKGROUND OF THE INVENTION

Most organizations have information management problems that require access to timely information for business monitoring, including the need to integrate many disparate applications in order to provide that information completely. Many of these applications come from different vendors who use their own nomenclature for application metadata, which makes the integration of data from the different applications very difficult.

For example, an insurance company may use different databases, with different applications purchased from different vendors, to provide underwriting, rate quotes, and motor vehicle information, each of which may have its own lexical and semantic conventions for handling data. One database may use the term "customer_number," but another database may refer to the same data as "customer_no" and a third database as "customer_id," making it hard to match this information efficiently. Similarly, one database may use "employee-number" and another database "employee_id" for the same data. Different conventions may apply not just to such lexical differences, but to semantic ones as well. For example, one database may define the term "employee" to include full-time employees as well as part-time employees and contractors, but another database may exclude contractors from the category "employee." This can make it very difficult to monitor and evaluate the category "employee," over multiple databases. One approach to normalizing transactions with semantic differences is to describe those transactions with ontologies, where the ontologies provide a description logic and a taxonomy. By applying a source ontology to a transaction, the transaction may be interpreted according to the semantics provided for by the ontology.

Two different methods have typically been used to solve this problem. One solution is called Enterprise Application Integration (EAI), which uses a real-time message monitor to obtain information about different databases through real-time messages from those databases. Transformation of data from one system to the next is also accomplished in real time. The advantage of this real-time transformation in terms of alerting and reporting is that new information can be acted on by the monitor immediately. Notifications and alerts can be triggered by the arrival of new messages. The disadvantage of this approach for alerting and notification purposes is that not all application functions result in a message being generated to another system. Often, these transactions are isolated to the application and its data store and are therefore invisible to the monitor.

Another solution, called Extraction, Transformation, and Loading (ETL), is focused on persistent data and is usually run in batch mode. These products are based on a pull model, meaning that they pull their data from the disparate databases without waiting for messages from those databases. Once this data is pulled, mapping programs are run on the data to normalize the metadata differences into a standardized, more useable form. The normalized data is then usually sent to a data mart or data warehouse, where it can be accessed for purposes of historical analytics or to create an off-line reporting system where large queries will not affect the response times of an active user's normal transactions such as create, update or delete.

However, one disadvantage of this process is that special programs must be written for the conversion of data from the different databases, which is time-consuming and expensive. Moreover, the traffic load of this process strains the resources of the databases when the data is being pulled from them. The ETL process, even though run at night, will create a significant degradation in transaction response times for end users of the databases. This is a major disadvantage since, with the advent of the Internet, databases typically must function at a high level twenty-four hours a day, every day. In addition, once this process has been put into place it can be disrupted or broken if one or more of the databases involved are updated. Another problem with this approach is that the data it provides is not available in real time, although real-time monitoring of databases can be crucial for a business.

Therefore, there is a need for an automated system and method to normalize persistent data sources for real-time monitoring without straining the resources of the data sources.

BRIEF SUMMARY OF THE INVENTION

It is an aspect of the present invention to provide an automated system and method to normalize persistent data sources for monitoring.

It is another aspect of the present invention to provide normalization, also called semantic mediation, and monitoring of data sources that does not strain the resources of the data sources.

It is still another aspect of the present invention to provide normalization and monitoring of data sources that is real time.

These and other needs are addressed by the present invention. The following explanation describes the present invention by way of example and not by way of limitation.

In accordance with the present invention, a semantic database transaction monitor is provided that monitors database transactions by taking advantage of database replication technology. The invention receives one or more event streams of transaction data from one or more database replication software agents, originally from transaction logs, and then classifies each transaction, utilizing an inference engine populated with one or more source ontologies and a canonical ontology, so that transaction metadata are normalized. If necessary, the inference engine can further employ a destination ontology to transform transactions into the metadata language of a target database. The invention then can be utilized to create a data store across multiple databases for reporting and analysis. The invention can also be used to feed normalized database transactions to real-time graphics software for real-time reporting or alerting. Because the process obtains data from event streams, it does not significantly drain the resources of the databases and can provide virtually real-time monitoring. Moreover, it does not require recoding for updates to the databases, but only changes to the ontologies read at runtime.

BRIEF DESCRIPTION OF THE DRAWINGS

The following embodiment of the present invention is described by way of example only, with reference to the accompanying drawings, in which.

DETAILED DESCRIPTION

The following description is offered to illustrate the present invention clearly. However, it will be apparent to those skilled in the art that the concepts of the present invention are not limited to these specific details. Commonly known elements are also shown in block diagrams for clarity, as examples and not as limitations of the present invention.

Operating Environment

Figure 1:
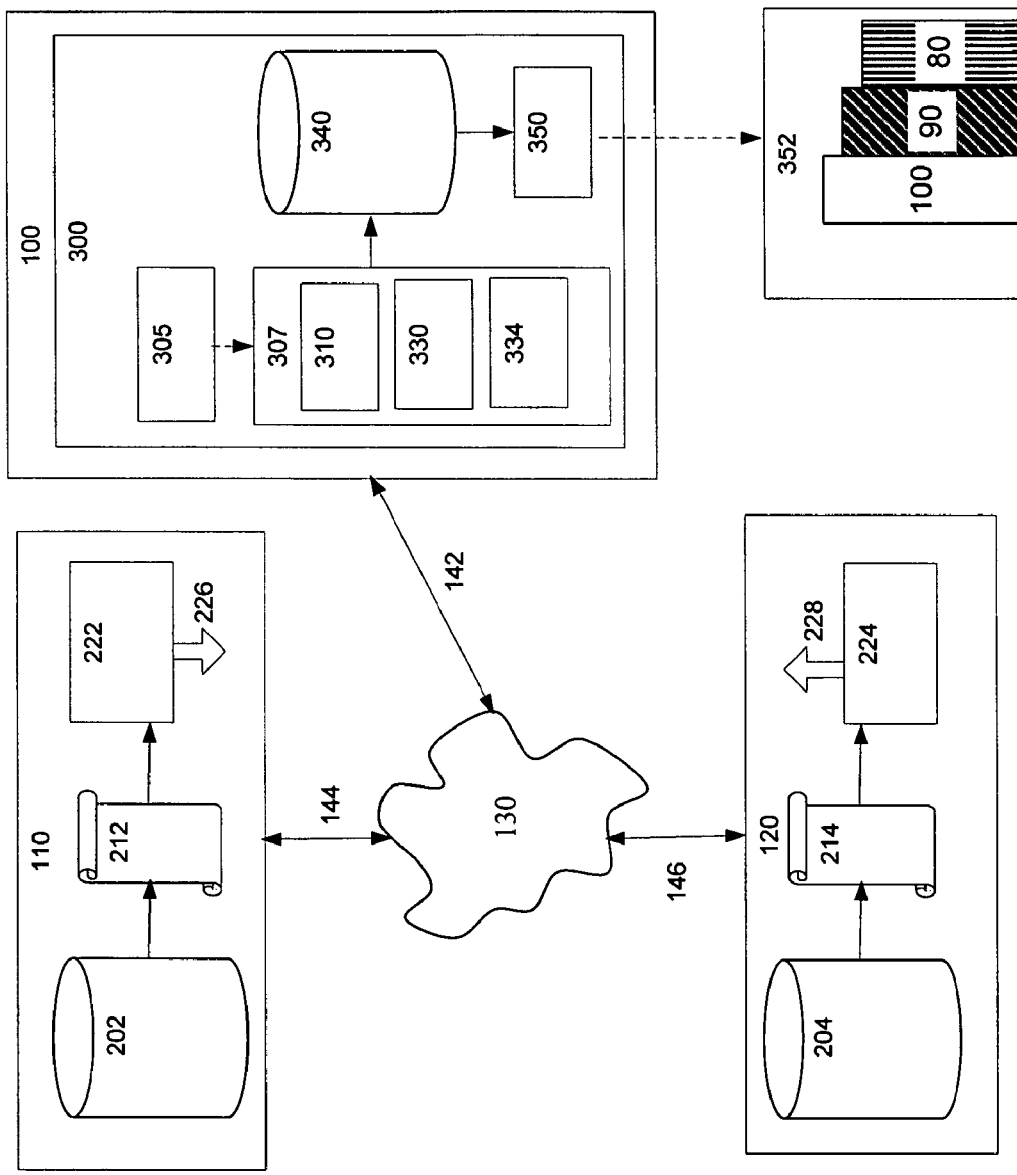
FIG. 1 is a block diagram that illustrates an operating environment in which embodiments of the present invention can be employed.

An embodiment of the operating environment of the present invention is shown in FIG. 1. A party employs server 100 to operate a semantic database transaction (SDT) monitor 300.

Server 100 can communicate with remote servers 110 and 120 via a wired or wireless link 142, a wired or wireless network 130, and wired or wireless links 144 and 146. The servers 100, 110, and 120 may be personal computers or larger computerized systems or combinations of systems. The network 130 may be the Internet, a private LAN (Local Area Network), a wireless network, a TCP/IP (Transmission Control Protocol/Internet Protocol) network, or other communications system, and can comprise multiple elements such as gateways, routers, and switches. Links 142, 144, and 146 use technology appropriate for communications with network 130. Through the operating environment shown in FIG. 1, SDT (semantic database transaction) monitor 300 can receive data from databases 202 and 204 on one or more remote servers 110 and 120.

In other embodiments, databases 202 and 204 may be located on server 100 or on a system of internally networked servers.

Process

Figure 2:
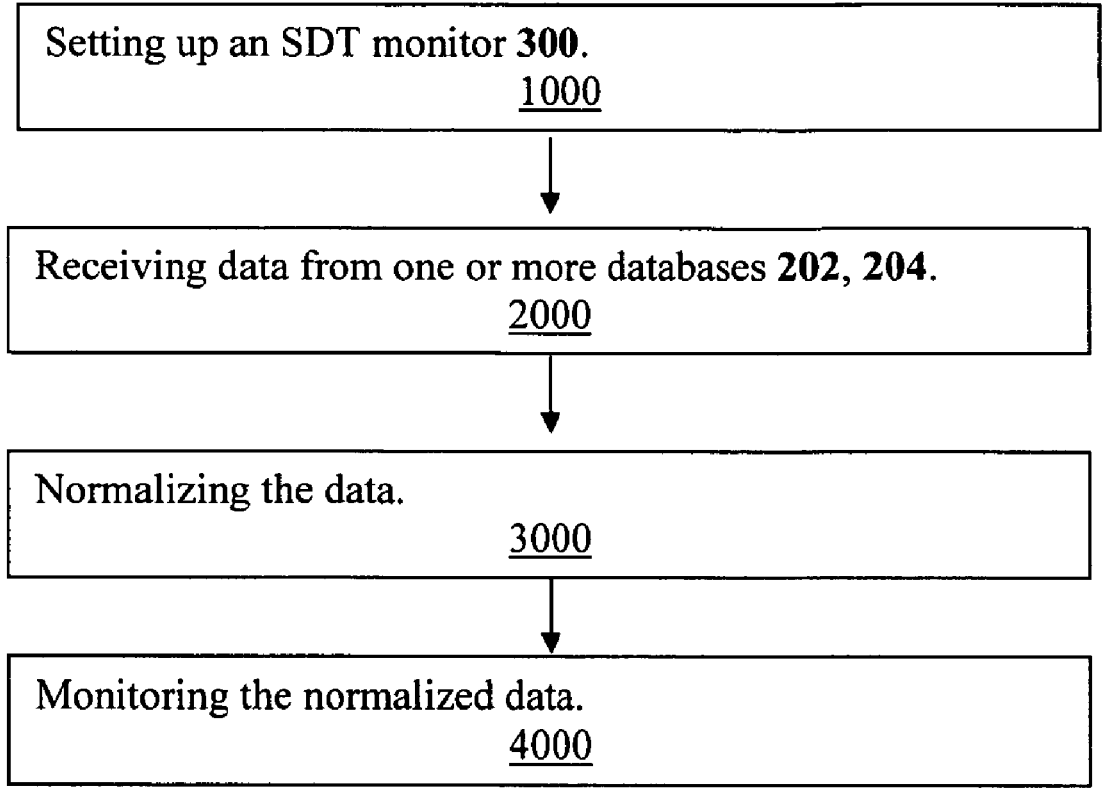
FIG. 2 is a flow chart illustrating a process for employing a semantic database transaction (SDT) monitor.

FIG. 2 shows an embodiment of a process for employing an SDT monitor:

Step 1000 in FIG. 2—Setting up an SDT monitor 300;
Step 2000 in FIG. 2—Receiving data from one or more databases 202, 204;
Step 3000 in FIG. 2—Normalizing the data; and
Step 4000 in FIG. 2—Monitoring the normalized data.

Setting Up an SDT Monitor

An SDT monitor 300, shown in FIG. 1, is a collection of software programs and supporting elements used to normalize data for monitoring. A party at server 100 may set up the SDT monitor 300 on server 100. After the STD monitor 300 has been created, it may also be employed on other servers.

In an embodiment, an SDT monitor 300 comprises the following elements, explained below:

A reader program 305 for reading transactions in an event stream, such as may be generated by a database replication agent that streams database transaction data read from a corresponding database transaction log,
An inference (reference) engine 307,
One or more source ontologies 310,
A canonical ontology 330,
A destination ontology 334, if necessary,
A data base 340, and
Real-time graphics software 350.

In other embodiments, these elements may be located separately in more widely dispersed systems involving multiple servers.

Receiving Data from One or More Databases

Figure 3:
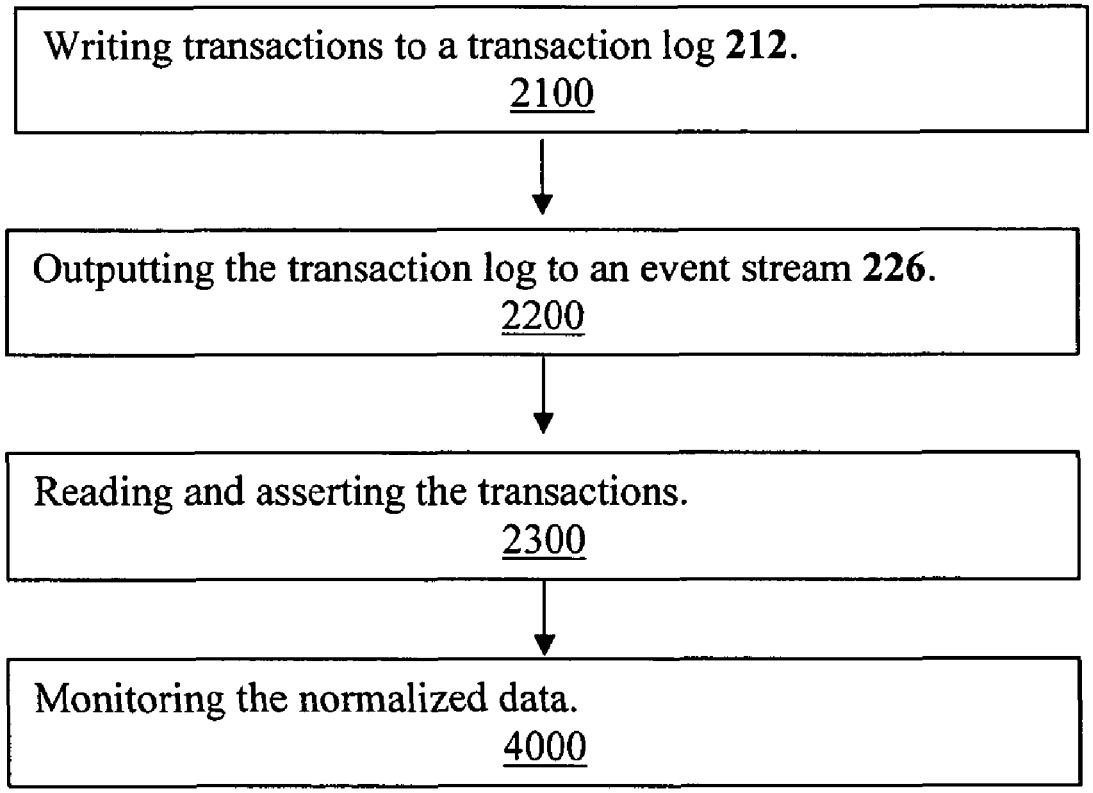
FIG. 3 is a flow chart illustrating a process for receiving the data to be monitored.

FIG. 3 shows an embodiment of a process for receiving the data to be monitored.

Step 2100 in FIG. 3—Writing Transactions to a Transaction Log 212.

A database 202, shown in FIG. 1, capable of generating transaction logs, writes transactions to its transaction log 212. Every transactional database writes data about its transactions into a transaction log 212. Transaction logs are typically used for "rollbacks" for undoing problems. For example, an application comprising three transactions may successfully process two of the transactions but then suffer a glitch with the third, causing the whole application process to fail. Database vendors have ways to read a transaction log and create a stream of data that can be applied to another database, so that the process can be replayed in a rollback, corrected if necessary, and completed. This replication of data in a mirror database can be quite effective for completing processes, but it cannot replicate data across different databases and does not in itself accomplish normalization, also called semantic mediation, of data across different databases.

Step 2200 in FIG. 3—Outputting the Transaction Log to an Event Stream 226.

A software program called a replication agent 222, shown in FIG. 1, located on server 110 continuously reads the transaction log 212 and outputs the transactions to an event stream 226.

Step 2300 in FIG. 3—Reading and Asserting the Transactions.

The STD monitor 300, shown in FIG. 1, on server 100 contacts the server 110 for database 202 and uses a reader program 305 to read the transactions in the event stream 226. Reading the transactions from the event stream 226 does not strain the resources of the database 202 in the way explained above, so that database 202 always remains fully functional.

The reader program 305 asserts the transaction into a reference engine 307 that has been previously populated with one or more source ontologies 310 containing the metadata from one or more source databases, such as 202 and 204. The reference engine 307 has also been populated with a canonical ontology 330, representing a canonical model, and with the relationships between the source ontologies 310 and the canonical ontology 330. An ontology is a conceptual schema about a group of computers and devices on a network that are administered as a unit with common rules and procedures. The canonical ontology 330 establishes the lexical and semantic rules that will be used for normalization.

For example, a source ontology 310 for database 202 may use the term "customer_no," but the canonical ontology 330 may establish that the term "customer_number" is to be used for normalization across databases.

One aspect of the current invention is the use of semantic classification "reasoners" against a near-real-time stream of database transactions. Prior art methods of normalizing a database typically require the processing of a large number of database records. By contrast, in the present invention, the database transactions are monitored, duplicated, and normalized in near real-time. The normalization is provided by applying the source and destination ontologies to the duplicated data streams.

This approach permits a classification of a single transaction into multiple classes according to the ontologies. For instance in a banking example, if a bank customer has a financial transaction of more than $10,000 in a day, and that customer is an officer of a corporation, then the transaction may be treated as a routine banking event according to a first ontology; and may also be flagged as a potential Sarbanes-Oxley violation according to a second ontology. Those classifications are available sooner under the current invention than they are available under conventional batch normalization of databases.

The size of the prior art batch processes imposes a large demand on the databases, and may require that those databases are not accessible for some period of time. By contrast, since the current invention processes one event at a time, there is very little load on the database.

From another perspective, the current invention provides a "push" system for immediately providing normalized transaction data. By contrast, prior art systems are typically "pull" systems which conduct batch processing of the past transactions in order to normalize the data. In these prior art systems, the normalized data is not typically available until the batch process is completed.

Normalizing the Data

Figure 4:
FIG. 4 is a flow chart illustrating a process for normalizing data.

FIG. 4 shows an embodiment of a process for normalizing the data.

Step 3100 in FIG. 4—Transforming Transactions to Destination Canonical Instances.

In an embodiment, the reference engine 307, shown in FIG. 1, uses the ontologies 310 and 330 and relationships described above to inference and transform source transactions to destination canonical instances. That is, the reference engine 307 is designed, by axioms written with description logic, to map the structures used by the source transactions and transform them to the canonical structure to be used for standardization and monitoring. To carry out this task, the reference engine 307 may employ reasoner programs designed to make automatic classifications.

For example, the reference engine 307 may transform the term "customer_no, in database 202, to the term "customer_number," according to the convention established in the canonical ontology 330.

In another embodiment, the inference (reference) engine 307 uses a canonical ontology 330, as described above, and then uses a destination ontology 334 that is designed to accommodate a specific target database, transforming transactions into the metadata language of the target database.

In still another embodiment, the inference (reference) engine 307 does not use any ontologies but is previously loaded with the source database's metadata and is capable of recognizing the content of transactions in the event stream 226 and acting upon that recognition by invoking a process such as a Web service.

Step 3200 in FIG. 4—Storing the Normalized Data.

These normalized instances can be stored in a database 340, shown in FIG. 1, which may be used as a data warehouse or a data mart, for reporting and analysis.

Monitoring the Normalized Data

The normalized instances can then be output to real-time graphics software 350, such as a business activity monitor, to monitor the normalized transaction stream in real time. For example, the real-time graphics software 350 can graphically represent the normalized transaction stream in a data screen 352, for example in charts of information 80, 90, and 100. A separate process can monitor the normalized transaction stream and generate alerts and notifications based on the transaction content.

Monitoring Multiple Databases

The process described above can be used with multiple databases as well, for example including not only database 202 but database 204. This enables the SDT monitor 300 to receive, normalize, and monitor data across multiple different databases.

Real-Time Monitoring

The process described above is very rapid, typically taking only a second to complete, so that virtually real-time monitoring can be accomplished.

Efficiency with Changes to Source Metadata

Changes to source databases' metadata do not require changes in code, but only in the ontology read at runtime.

Example 1

Figure 6:
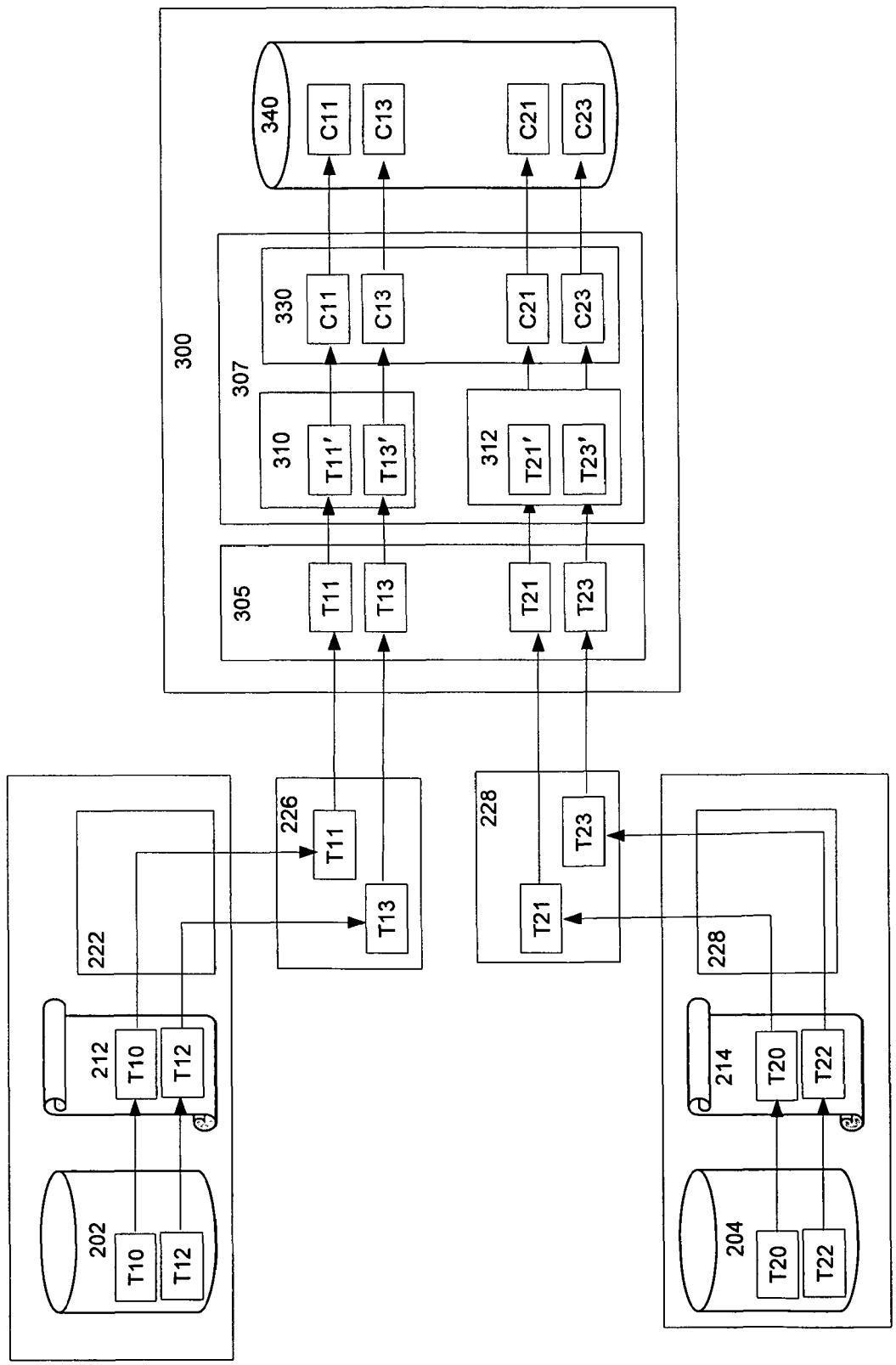
FIG. 6 is an example illustrating the replication and normalization of transactions within data streams.

FIG. 6 illustrates an example of transactions T10 and T12 from database 202 and transactions T20 and T22 from database 204. Transaction T10 is logged on data log 212 and replicated by replication agent 222 to transaction T11 in a first event stream 226. Transaction T12 is logged on data log 212 and replicated to transaction T13 in the first event stream 226. Data reader 305 captures the first event stream 226, and directs transactions T11 and T13 to the inference engine 307 where the transactions are transformed to transactions T11' and T13' according to a first source ontology 310 and then normalized to canonical form by canonical ontology 330 and stored as canonical instances C11 and C13 respectively in the canonical database 340.

Similarly, transaction T20 is logged on data log 214 and replicated by replication agent 224 to transaction T21 in a second event stream 228. Transaction T22 is logged on data log 214 and replicated to transaction T23 in the second event stream 228. Data reader 305 captures the second event stream 228, and directs transactions T21 and T23 to the inference engine 307 where the transactions are transformed to transactions T21' and T23' according to a second source ontology 312 and then normalized to canonical form by canonical ontology 330 and stored as canonical instances C21 and C23 respectively in the canonical database 340.

In this example, transactions T10 and T20 mapped to different instances of the same structure, and transactions T12 and T22 are mapped to instances of different structures.

Example 2

Using a Destination Ontology

Figure 7:
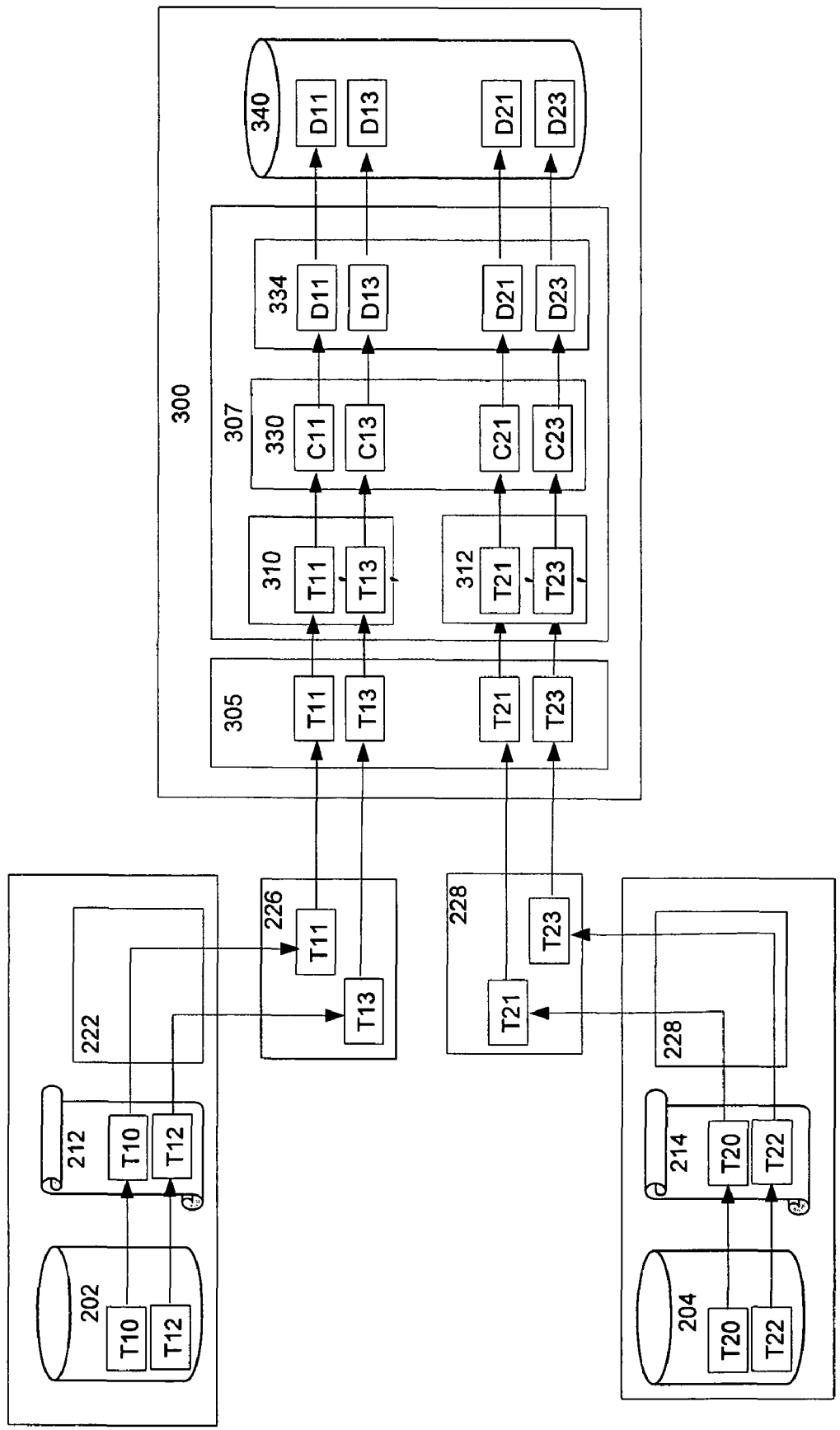
FIG. 7 is an example of the use of a destination ontology for the example of FIG. 6.

To show the use of a destination ontology 334, FIG. 7 illustrates the example given above of transactions T10 and T12 from database 202 and transactions T20 and T22 from database 204. Transaction T10 is logged on data log 212 and replicated by replication agent 222 to transaction T11 in a first event stream 226. Transaction T12 is logged on data log 212 and replicated to transaction T13 in the first event stream 226. Data reader 305 captures the first event stream 226 and directs transactions T11 and T13 to the inference engine 307, where the transactions are transformed to transactions T11' and T13' according to a first source ontology 310 and then normalized to canonical form C11 and C13 respectively by canonical ontology 330. C11 and C13 are then transformed into a target database's metadata language as D11 and D13 respectively by destination ontology 334, and D11 and D13 are stored in the canonical database 340.

Similarly, transaction T20 is logged on data log 214 and replicated by replication agent 224 to transaction T21 in a second event stream 228. Transaction T22 is logged on data log 214 and replicated to transaction T23 in the second event stream 228. Data reader 305 captures the second event stream 228 and directs transactions T21 and T23 to the inference engine 307, where the transactions are transformed to transactions T21' and T23' according to a second source ontology 312 and then normalized to canonical form C21 and C23 respectively by canonical ontology 330. C21 and C23 are then transformed into a target database's metadata language as D21 and D23 respectively by destination ontology 334, and D21 and D23 are stored in the canonical database 340.

In this example, transactions T10 and T20 mapped to different instances of the same structure, and transactions T12 and T22 are mapped to instances of different structures.

Computer System Overview

Figure 5:
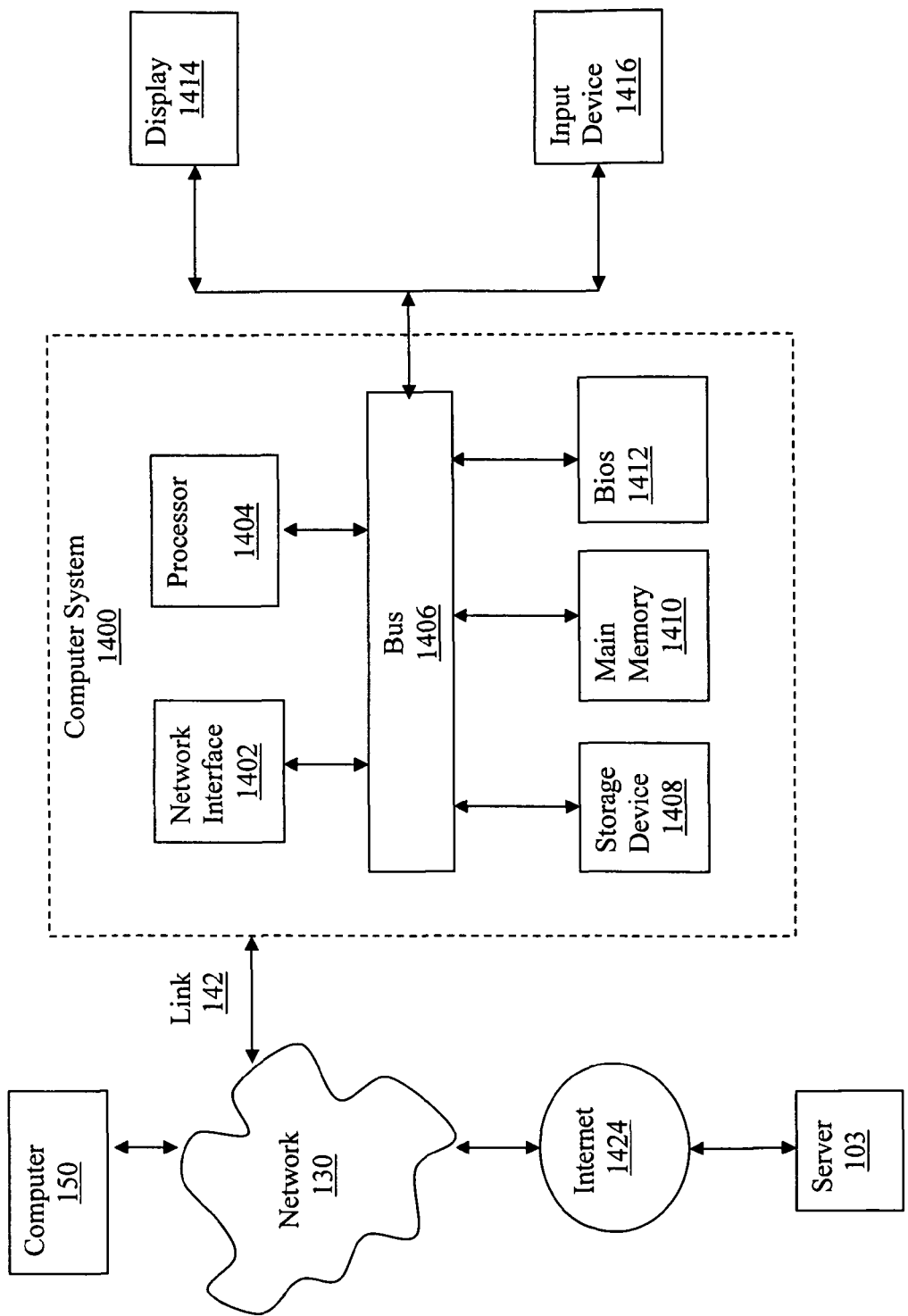
FIG. 5 is a block diagram illustrating a typical computer on which embodiments of the present invention may be employed.

FIG. 5 is a block diagram that illustrates an example of a typical computer system 1400, well known to those skilled in the art, on which embodiments of the present invention can be implemented. This computer system 1400 comprises a network interface 1402 that provides two-way communications through a wired or wireless link 142 to a wired or wireless communications network 130 that uses any applicable communications technology. For example, the network 130 can comprise a public telephone network, a wireless network, a local area network (LAN), and any known or not-yet-know applicable communications technologies, using correspondingly applicable links. The network 130 in turn provides communications with one or more host computers 150 and, through the Internet 1424, with one or more servers 103.

The network interface 1402 is attached to a bus 1406 or other means of communicating information. Also attached to the bus 1406 are the following:
a processor 1404 for processing information;
a storage device 1408, such as an optical disc, a magneto-optical disc, or a magnet disc, for storing information and instructions;
main memory 1410, which is a dynamic storage device such as a random access memory (RAM) that stores information and instructions to be carried out by processor 1404;
a bios 1412 or another form of static memory such as read only memory (ROM), for storing static information and instructions to be carried out by processor 1404;
a display 1414, such as a liquid crystal display (LDC) or cathode ray tube (CRT) for displaying information to user of the computer system 1400; and
an input device 1416, with numeric and alphanumeric keys for communicating information and commands to processor 1404. In another embodiment a mouse or other input devices can also be used.

The computer system 1400 is used to implement the methods of the present invention in one embodiment. However, embodiments of the present invention are not limited to specific software and hardware configurations. Computer system 1400 can send data to target computer 150 and target server 103, through a network 130 such as the Internet, and appropriate links 142, such as wired or wireless ones, and its network interface 1402.

Computer system 1400 carries out the methods of the present invention when its processor 1404 processes instructions contained in its main memory 1410. Another computer-readable medium, such as its storage device 1408, may read these instructions into main memory 1410 and may do so after receiving these instructions through network interface 1402. Processor 1404 further processes data according to instructions contained in its storage device 1408. Data is relayed to appropriate elements in computer system 1400 through its bus 1406. Instructions for computer system 1400 can also be given through its input device 1416 and display 1414.

"Computer-readable medium" refers to any medium that provides instructions to processor 1404, comprising volatile, non-volatile, and transmission media. Volatile media comprise dynamic memory, such as main memory 1410. Non-volatile media comprise magnetic, magneto-optical, and optical discs, such as storage device 1408. Transmission media comprise a wide range of wired and unwired transmission technology, comprising cables, wires, modems, fiber optics, acoustic waves, such as radio waves, for example, and light waves, such as infrared, for example. Typical examples of widely used computer-readable media are floppy discs, hard discs, magnetic tape, CD-ROMs, punch cards, RAM, EPROMs, FLASH-EPROMs, memory cards, chips, and cartridges, modem transmissions over telephone lines, and infrared waves. Multiple computer-readable media may be used, known and not yet known, can be used, individually and in combinations, in different embodiments of the present invention.

ALTERNATE EMBODIMENTS

It will be apparent to those skilled in the art that different embodiments of the present invention may employ a wide range of possible hardware and of software techniques. For example the communication between servers could take place through any number of links, including wired, wireless, infrared, or radio, and through other communication networks beside those cited, including any not yet in existence.

Also, the term computer as used here is used in its broadest sense to include personal computers, laptops, telephones with computer capabilities, personal data assistants (PDAs) and servers, and it should be recognized that it could include multiple servers, with storage and software functions divided among the servers. A wide array of operating systems, compatible e-mail services, Web browsers and other communications systems can be used to transmit messages among client applications and Web services.

Furthermore, in the previous description the order of processes, their numbered sequences, and their labels are presented for clarity of illustration and not as limitations on the present invention.

What is claimed is:

1. A system for normalizing persistent data that is monitored comprising:
   a network;
   at least one remote server communicably coupled to the network;
   a plurality of source databases, each residing on an associated remote server, wherein each source database has its own lexical and semantic conventions for handling data and is capable of generating a transaction log such that associated database source transaction data is output to a corresponding event stream;
   a first server communicably coupled to each remote server through the network;
   a semantic database transaction monitor residing on the first server, the semantic database transaction monitor comprising;
      a reader program that reads the database source transaction data in each event stream;
      at least one source ontology containing metadata from at least one of the plurality of source databases,
      a common canonical ontology representing a canonical model that establishes both lexical and semantic rules for normalization of source transaction data and relationships between each source ontology and the common canonical ontology;

an inference engine that infers and transforms the database source transaction data from each event stream into normalized destination canonical instances in a corresponding normalized transaction stream by transforming the database source transaction data according to a corresponding source ontology and then normalizing the transformed database source transaction data according to the common canonical ontology; and a normalized database that stores the normalized destination canonical instances; and a monitor that monitors the normalized transaction stream and conveys alert notifications based upon the transaction content of the normalized transaction stream.

2. The system of claim 1 wherein the semantic database transaction monitor further comprises real-time graphics software that graphically represents the normalized transaction stream on a display screen.

3. The system of claim 1 further comprising a database replication agent that outputs one of the event streams based upon reading an associated transaction log of a corresponding one of the plurality of source databases.

4. The system of claim 1, further comprising:
a target database; and
a destination ontology designed to accommodate the target database;
wherein:
select transactions associated with the common canonical ontology are transformed from their normalized destination canonical instance into the metadata language of the target database.

5. A system for normalizing and monitoring data from a plurality of databases comprising:
a semantic database transaction monitor comprising:
a program that streams database transaction data from at least one of the plurality of databases into a corresponding event stream;
at least one source ontology for each of the plurality of databases, each source ontology containing metadata associated with its source database;
a common canonical ontology that represents a canonical model that establishes both lexical and semantic rules for normalization of source transaction data and relationships between each source ontology and the common canonical ontology; and
an inference engine that infers and transforms the database source transaction data from each event stream into normalized destination canonical instances in a corresponding normalized transaction stream;
a transaction log comprising a plurality of event transactions from the plurality of databases, wherein the transaction log is configured to be output to a corresponding one of the event streams;
wherein the transactions from each event stream are read and asserted into the inference engine, wherein the inference engine converts the transactions by transforming the database source transaction data according to a corresponding source ontology and then by normalizing the transformed database source transaction data according to the common canonical ontology;
a normalized database that stores the normalized destination canonical instances; and
a monitoring application that conveys the normalized destination canonical instances; and
wherein the normalized data is monitored using the monitoring application that received the conveyed normalized canonical instances.

6. The system of claim 5 further comprising a replication agent that continuously reads the transaction log, wherein the plurality of event transactions are output to an event stream.

7. The system of claim 6 further comprising a reader program in the semantic database transaction monitor that is utilized to read the transactions in the event stream.

8. The system of claim 5 further comprising:
a plurality of source ontologies populated in the inference engine, the source ontologies describing the metadata from one or more source databases; and
a canonical ontology populated in the inference engine, the canonical ontology representing the lexical and semantic rules that will be used to normalize the data to a destination canonical structure;
wherein the source ontologies and the canonical ontology are utilized to read and assert the transactions.

9. The system of claim 8, wherein the inference engine is utilized to transform transactions to destination canonical instances of the destination canonical structure by mapping the data structures of the database transactions, into the canonical structure, thereby providing normalized data, and wherein the normalized data is stored.

10. The system of claim 5 wherein the semantic database transaction monitor is utilized to provide normalized data, wherein at least a portion of the normalized data is plotted with graphics software.

* * * * *